United States Patent
Cho et al.

(10) Patent No.: US 7,567,545 B2
(45) Date of Patent: Jul. 28, 2009

(54) APPARATUS AND METHOD FOR TRANSMITTING/RECEIVING AN UPLINK PILOT SIGNAL IN A COMMUNICATION SYSTEM USING AN ORTHOGONAL FREQUENCY DIVISION MULTIPLE ACCESS SCHEME

(75) Inventors: Young-Kwon Cho, Suwon-si (KR); Jung-Min Ro, Seoul (KR); Hyeon-Woo Lee, Suwon-si (KR); Seok-Hyun Yoon, Seoul (KR); Dong-Seek Park, Yongin-si (KR); Chang-Ho Suh, Seoul (KR); Chan-Byoung Chae, Seoul (KR); Su-Ryong Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 557 days.

(21) Appl. No.: 10/955,131

(22) Filed: Sep. 30, 2004

(65) Prior Publication Data

US 2005/0068931 A1    Mar. 31, 2005

(30) Foreign Application Priority Data

Sep. 30, 2003    (KR) .................. 10-2003-0070434

(51) Int. Cl.
*H04B 7/208*    (2006.01)
(52) U.S. Cl. .................. 370/344; 370/345; 370/329
(58) Field of Classification Search ................. 250/591; 370/344
See application file for complete search history.

(56) References Cited

U.S. PATENT DOCUMENTS

| | | | |
|---|---|---|---|
| 6,268,614 | B1 | 7/2001 | Imai |
| 6,941,151 | B2 * | 9/2005 | Takahashi et al. ............ 455/502 |
| 7,286,508 | B2 * | 10/2007 | Abeta et al. .................. 370/335 |
| 2003/0123530 | A1 * | 7/2003 | Maeda et al. ................ 375/148 |
| 2004/0008655 | A1 * | 1/2004 | Park et al. .................... 370/342 |
| 2004/0081123 | A1 * | 4/2004 | Krishnan et al. ............. 370/329 |

FOREIGN PATENT DOCUMENTS

| | | |
|---|---|---|
| EP | 0 553 841 | 1/1993 |
| EP | 1 158 709 | 11/2001 |
| JP | 05-219021 | 8/1993 |
| JP | 08-265293 | 10/1996 |
| JP | 2002-246958 | 8/2002 |
| JP | 2003-258766 | 9/2003 |
| WO | WO 98/59450 | 12/1998 |
| WO | WO 03/075500 | 9/2003 |
| WO | WO 03/079593 | 9/2003 |

* cited by examiner

*Primary Examiner*—Lester Kincaid
*Assistant Examiner*—Steven Lim
(74) *Attorney, Agent, or Firm*—The Farrell Law Firm, LLP

(57) ABSTRACT

An apparatus and method for transmitting a reference signal in an Orthogonal Frequency Division Multiple Access (OFDMA) communication system in which a total frequency band is divided into a plurality of subcarrier bands. A time division multiplexer performs time division multiplexing such that the reference signal is transmitted for a first duration in a predetermined number of subcarrier bands from among the plurality of the subcarrier bands, and a signal other than the reference signal is transmitted for a second duration other than the first duration. A transmitter transmits the time-division multiplexed subcarrier band signals.

4 Claims, 13 Drawing Sheets

APPARATUS AND METHOD FOR TRANSMITTING/RECEIVING AN UPLINK PILOT SIGNAL IN A COMMUNICATION SYSTEM USING AN ORTHOGONAL FREQUENCY DIVISION MULTIPLE ACCESS SCHEME

PRIORITY

This application claims priority under 35 U.S.C. § 119 to an application entitled "Apparatus and Method for Transmitting/Receiving an Uplink Pilot Signal in a Communication System Using an Orthogonal Frequency Division Multiple Access Scheme" filed in the Korean Intellectual Property Office on Sep. 30, 2003 and assigned Ser. No. 2003-70434, the contents of which are incorporated herein by reference.

BACKGROUND OF THE INVENTION

1. Field of the Invention

The present invention relates generally to a communication system using a multiple access scheme, and in particular, to an apparatus and method for transmitting/receiving pilot signals in a communication system using an Orthogonal Frequency Division Multiple Access (OFDMA) scheme.

2. Description of the Related Art

The development of mobile communication systems such as a 1x Enhanced Variable (1xEV) communication system and a High Speed Downlink Packet Access (HSDPA) communication system has widely contributed to opening the wireless multimedia service age. As a result, a subscriber station (SS) can access the Internet and receive a desired service even while on the move.

Research and the continuing development in a $4^{th}$ generation (4G) mobile communication system is being made considering both software for developing various contents and hardware for developing a wireless access scheme having high spectrum efficiency to provide the best quality-of-service (QoS).

A description will now be made of the hardware considered in the 4G mobile communication system.

In wireless communications, a high-speed high-quality data service is generally affected by a channel environment. The channel environment in wireless communications frequently varies due to additive white Gaussian noise (AWGN); a change in power of a received signal caused by fading; shadowing; Doppler effects caused by movement of a subscriber station and a frequent change in velocity of the subscriber station; interference by other users; and multipath signals. Therefore, in order to provide a high-speed wireless packet data service, an advanced new scheme capable of adaptively coping with variations in a channel environment is required in addition to the scheme provided in the existing wireless communication system.

The typical wireless access scheme which has been partially introduced into a mobile communication system and is expected to be actively used for the 4G mobile communication system, includes such link adaptation schemes as an Adaptive Modulation and Coding (AMC) scheme, and a Hybrid Automatic Retransmission reQuest (HARQ) scheme.

The AMC scheme adaptively applies a modulation/demodulation scheme and a coding scheme according to fading on a wireless transmission line in order to maximally utilize capacity of the wireless transmission line. The HARQ scheme requests retransmission of received defective packet data in a physical layer to minimize a transmission delay, thereby improving QoS.

The use of the AMC scheme and HARQ scheme contribute to a remarkable improvement in the entire system performance. To use such a link adaptation scheme as the AMC scheme, a receiver must continuously measure a condition of a link between a transmitter and the receiver. In order for the receiver to measure the link condition, the transmitter must transmit a reference signal based on which the receiver can measure the link condition. A pilot signal is typically used as the reference signal.

Both the AMC scheme and HARQ scheme were proposed considering the link condition. That is, the AMC scheme and HARQ scheme are applied according to a measurement result on a pilot signal between the transmitter and the receiver. However, the 4G mobile communication system will actively perform data transmission through the uplink, and data transmission through the uplink also requires a link adaptation scheme that considers the link condition. Accordingly, there is a demand for a scheme of transmitting a reference signal using an uplink link adaptation scheme.

SUMMARY OF THE INVENTION

It is, therefore, an object of the present invention to provide an apparatus and method for transmitting/receiving uplink pilot signals in a communication system using a multiple access scheme.

It is another object of the present invention to provide an apparatus and method for transmitting/receiving uplink pilot signals for transmission of a dedicated channel in a communication system using a multiple access scheme.

It is still another object of the present invention to provide an apparatus and method for transmitting/receiving uplink pilot signals for transmission of a shared channel in a communication system using a multiple access scheme.

According to a first aspect of the present invention, there is provided an apparatus for transmitting a reference signal in an Orthogonal Frequency Division Multiple Access (OFDMA) communication system in which a total frequency band is divided into a plurality of subcarrier bands, the apparatus including a time division multiplexer for performing time division multiplexing such that the reference signal is transmitted for a first duration in a predetermined number of subcarrier bands from among the plurality of the subcarrier bands, and a signal other than the reference signal is transmitted for a second duration other than the first duration; and a transmitter for transmitting the time-division multiplexed subcarrier band signals.

According to a second aspect of the present invention, there is provided an apparatus for receiving a reference signal in an Orthogonal Frequency Division Multiple Access (OFDMA) communication system in which a total frequency band is divided into a plurality of subcarrier bands, the apparatus including a first code division multiplexer for spreading the reference signal transmitted through one or more subcarrier bands from among the plurality number of subcarrier bands for a first duration in a predetermined number of subcarrier bands among the plurality of the subcarrier bands, from using a first code, and spreading a signal other than the reference signal, transmitted through subcarrier bands other than the subcarrier bands through which the reference signal is transmitted from among the plurality of subcarrier bands, using a second code; a second code division multiplexer for spreading a signal other than the reference signal, transmitted through the predetermined number of subcarrier bands for a second duration other than the first duration, using the second code; a time division multiplexer for performing time division multiplexing such that a signal output from the first code division multiplexer is transmitted for the first duration, and a signal output from the second code division multiplexer is transmitted for the second duration; and a transmitter for transmitting the time-division multiplexed subcarrier band signals.

According to a third aspect of the present invention, there is provided an apparatus for transmitting a reference signal in an Orthogonal Frequency Division Multiple Access (OFDMA) communication system in which a total frequency band is divided into a plurality of subcarrier bands, the apparatus including a receiver for performing a reception process on a signal; a subcarrier separator for separating a predetermined number of subcarrier band signals from among the plurality of the subcarrier bands from the reception-processed signal; and a time division demultiplexer for performing time division demultiplexing such that the separated subcarrier band signals are output as a reference signal for a first duration, and the separated subcarrier band signals are output as a signal other than the reference signal for a second duration other than the first duration.

According to a fourth aspect of the present invention, there is provided an apparatus for receiving a reference signal in an Orthogonal Frequency Division Multiple Access (OFDMA) communication system in which a total frequency band is divided into a plurality of subcarrier bands, the apparatus including a receiver for performing a reception process on a signal; a subcarrier separator for separating a predetermined number of subcarrier band signals from among the plurality of the subcarrier bands from the reception-processed signal; a time division demultiplexer for outputting the separated subcarrier band signals to a first code division demultiplexer for a first duration, and outputting the separated subcarrier band signals to a second code division demultiplexer for a second duration other than the first duration; the first code division demultiplexer for despreading a signal received through one or more subcarrier bands from among the predetermined number of subcarrier bands, using a first code, and despreading a signal received through subcarrier bands other than the subcarrier bands through which the reference signal is received among the predetermined number of subcarrier bands, using a second code; and the second code division demultiplexer for despreading a signal received through the predetermined number of subcarrier bands, using the second code.

According to a fifth aspect of the present invention, there is provided a method for transmitting a reference signal in an Orthogonal Frequency Division Multiple Access (OFDMA) communication system in which a total frequency band is divided into a plurality of subcarrier bands, the method including performing time division multiplexing such that the reference signal is transmitted for a first duration in a predetermined number of subcarrier bands from among the plurality of the subcarrier bands, and a signal other than the reference signal is transmitted for a second duration other than the first duration; and transmitting the time-division multiplexed subcarrier band signals.

According to a sixth aspect of the present invention, there is provided a method for receiving a reference signal in an Orthogonal Frequency Division Multiple Access (OFDMA) communication system in which a total frequency band is divided into a plurality of subcarrier bands, the method including performing time division multiplexing such that the reference signal and a signal other than the reference signal undergo code division multiplexing for a first duration in a predetermined number of subcarrier bands from among the plurality of the subcarrier bands, and the signal other than the reference signal undergoes code division multiplexing for a second duration other than the first duration; and transmitting the time-division multiplexed subcarrier band signals.

According to a seventh aspect of the present invention, there is provided a method for transmitting a reference signal in an Orthogonal Frequency Division Multiple Access (OFDMA) communication system in which a total frequency band is divided into a plurality of subcarrier bands, the method including performing a reception process on a signal, and separating a predetermined number of subcarrier band signals from among the plurality of the subcarrier bands from the reception-processed signal; and performing time division demultiplexing such that the separated subcarrier band signals are output as a reference signal for a first duration, and the separated subcarrier band signals are output as a signal other than the reference signal for a second duration other than the first duration.

According to an eighth aspect of the present invention, there is provided a method for transmitting a reference signal in an Orthogonal Frequency Division Multiple Access (OFDMA) communication system in which a total frequency band is divided into a plurality of subcarrier bands, the method including performing a reception process on a signal, and separating a predetermined number of subcarrier band signals from among the plurality of the subcarrier bands from the reception-processed signal; and performing time division demultiplexing such that the reference signal and a signal other than the reference signal are output by code-division demultiplexing the separated subcarrier band signals for a first duration, and the signal other than the reference signal is output by code-division demultiplexing the separated subcarrier band signals for a second duration except the first duration.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention proposes a pilot signal transmission/reception scheme for uplink link adaptation in a communication system using a multiple access scheme, for example, an Orthogonal Frequency Division Multiple Access (OFDMA) scheme (an OFDMA communication system), a multiple access scheme based on an Orthogonal Frequency Division Multiplexing (OFDM) scheme. The pilot signal is used as a reference signal for the uplink link adaptation. The term "link adaptation" refers to a control operation for adaptively controlling a transmission/reception operation according to a link condition by using a link adaptation scheme, such as an Adaptive Modulation and Coding (AMC) scheme.

Figure 1:
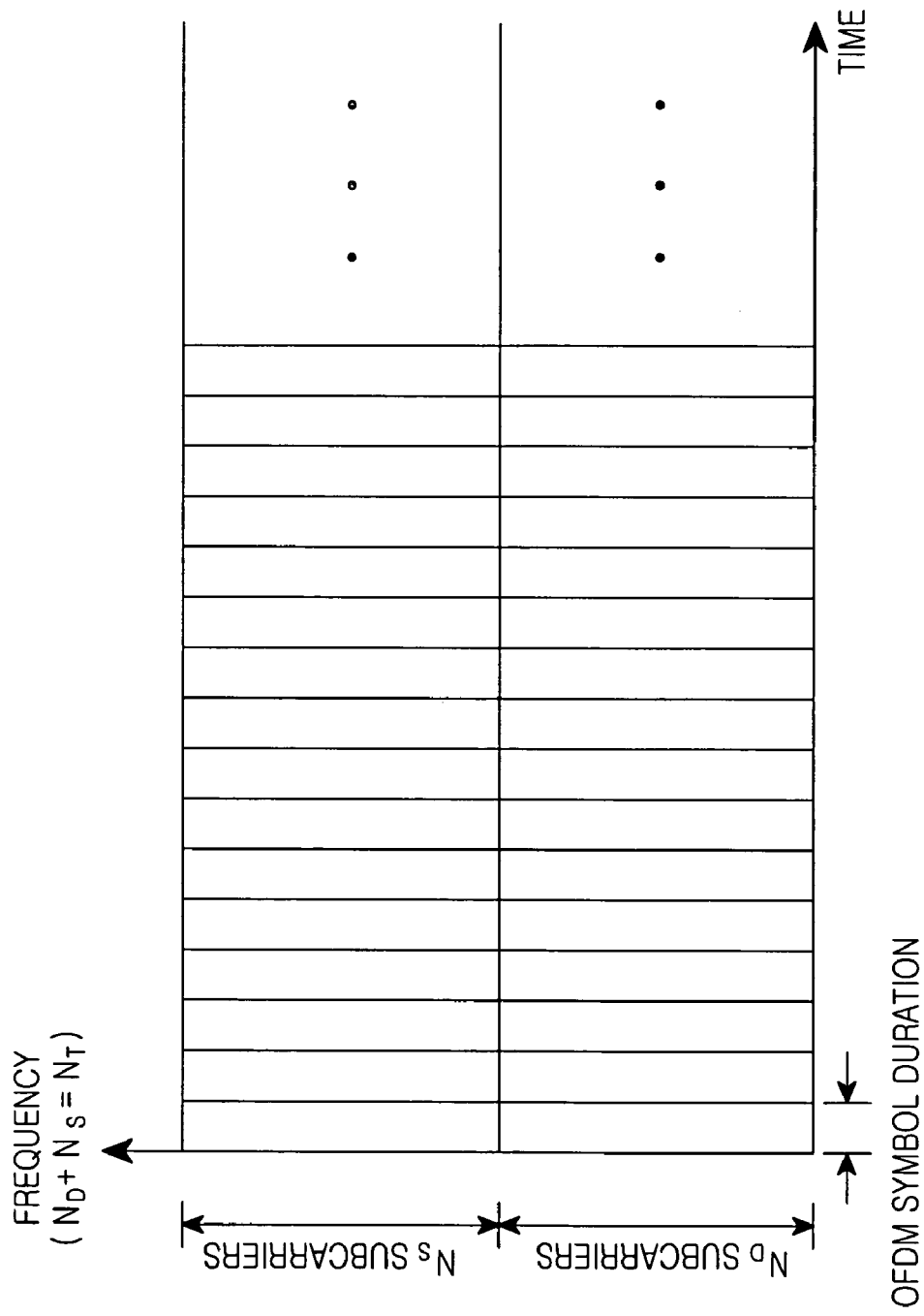
FIG. 1 is a diagram schematically illustrating assignment of uplink frequency resources in an OFDMA communication system to which embodiments of the present invention are applied.

FIG. 1 is a diagram schematically illustrating assignment of uplink frequency resources in an OFDMA communication system to which embodiments of the present invention are applied. Referring to FIG. 1, because the OFDMA communication system is a communication system based on an OFDM scheme, the total bandwidth is divided into a plurality of subcarrier bands. For convenience, a description of the present invention will be made with reference to a traffic channel among uplink channels. Of course, the uplink pilot signal transmission/reception scheme proposed in the present invention can also be applied to other uplink channels other than the traffic channel. The traffic channel can be separated into a dedicated traffic channel and a shared traffic channel. Generally, real-time service data such as voice data which is susceptible to a transmission delay is transmitted over the dedicated traffic channel, while non-real-time service data such as packet data which is not susceptible to the transmission delay is transmitted over the shared traffic channel.

It will be assumed in FIG. 1 that the total number of subcarriers available in the OFDMA communication system is $N_T$ and all of the $N_T$ subcarriers are assigned only to the traffic channel. Further, it will be assumed that among the $N_T$ subcarriers, $N_D$ subcarriers are assigned to a dedicated channel, i.e., a dedicated traffic channel, and the remaining $N_S$ subcarriers are assigned to a shared channel, i.e., a shared traffic channel ($N_T=N_D+N_S$). $N_D$ subcarriers assigned to the dedicated traffic channel and $N_S$ subcarriers assigned to the shared traffic channel can be divided into subchannels each comprised of a predetermined number of subcarriers. The term "subchannel" refers to a channel comprised of one or more subcarriers, and one subchannel can be comprised of one subcarrier or two or more subcarriers.

Figure 2:
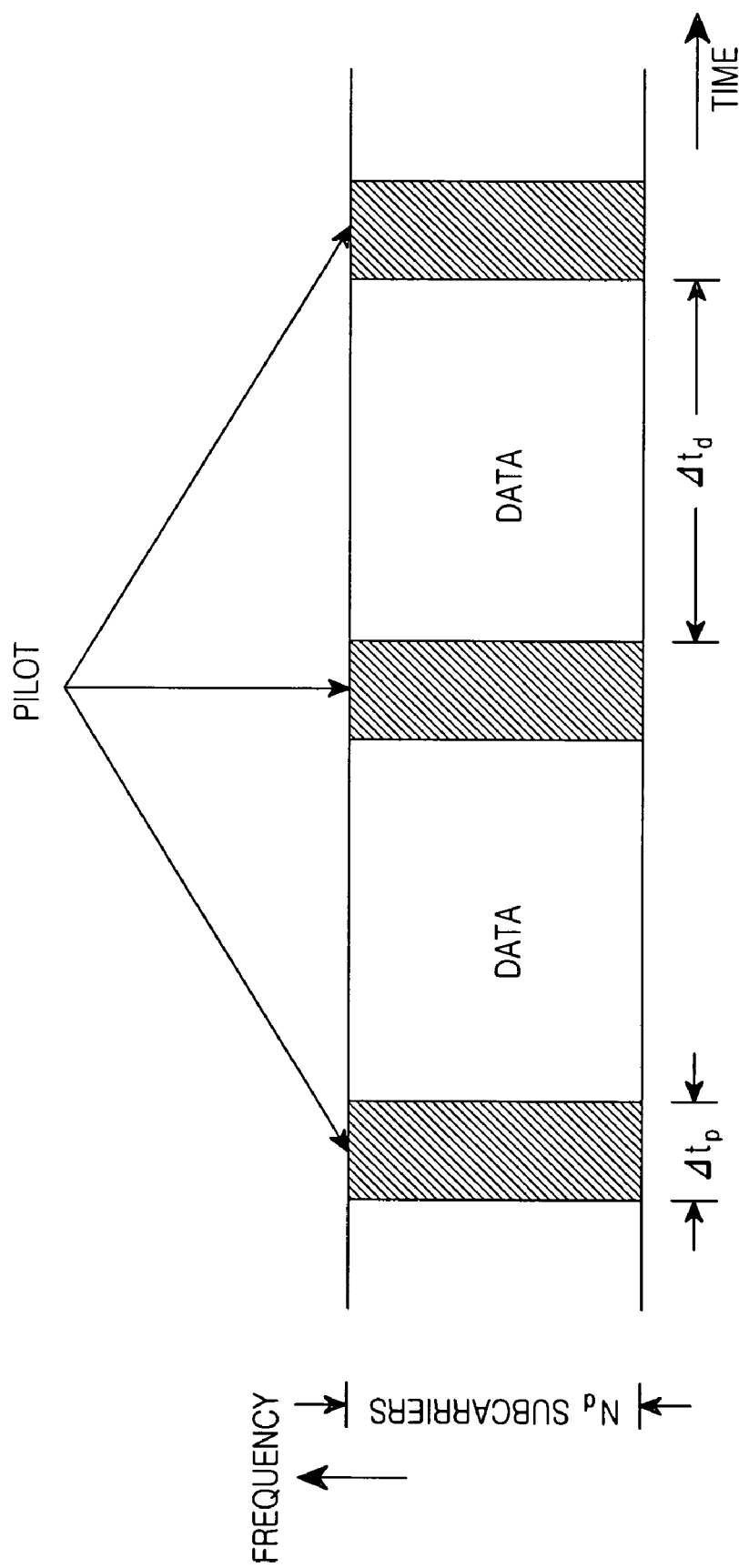
FIG. 2 is a diagram schematically illustrating an uplink pilot signal transmission structure according to a first embodiment of the present invention.

FIG. 2 is a diagram schematically illustrating an uplink pilot signal transmission structure according to a first embodiment of the present invention. In the uplink pilot signal transmission structure illustrated in FIG. 2, an OFDMA communication system assigns a subchannel comprised of $N_d$ ($N_d \leq N_D$) subcarriers to a transmitter, for example, a subscriber station (SS), as a dedicated traffic channel. That is, the first embodiment of the present invention proposes an uplink pilot signal transmission/reception scheme for the case where a dedicated traffic channel is assigned to a subscriber station. As illustrated in FIG. 2, uplink pilot signals are transmitted for a time $\Delta t_p$ at periods of $\Delta t_p+\Delta t_d$. For the time $\Delta t_p$, only a pilot signal is transmitted through all of the $N_d$ subcarriers. For convenience, the subcarriers through which a pilot signal is transmitted will be referred to as "pilot subcarriers," and the subcarriers through which a data signal is transmitted will be referred to as "data subcarriers." Therefore, an overhead of a pilot signal in a dedicated traffic channel comprised of the $N_d$ subcarriers is defined as $$\frac{\Delta t_p}{\Delta t_p + \Delta t_d}.$$

In the OFDMA communication system, one frame is comprised of a plurality of OFDM symbols, and each of the OFDM symbols is comprised of a plurality of symbols. Herein, the term "symbol" refers to a signal transmitted through each of subcarriers constituting one OFDM symbol, and in the case of FIG. 1, one OFDM symbol is comprised of $N_T$ symbols. In FIG. 2, for the time $\Delta t_p$, all of the $N_d$ symbols transmit a pilot signal, and in this case, for the time $\Delta t_p$, signals other than the pilot signal cannot be transmitted. For convenience, the symbol through which a pilot signal is transmitted will be referred to as a "pilot symbol," and the symbol through which a data signal is transmitted will be referred to as a "data symbol."

Figure 3:
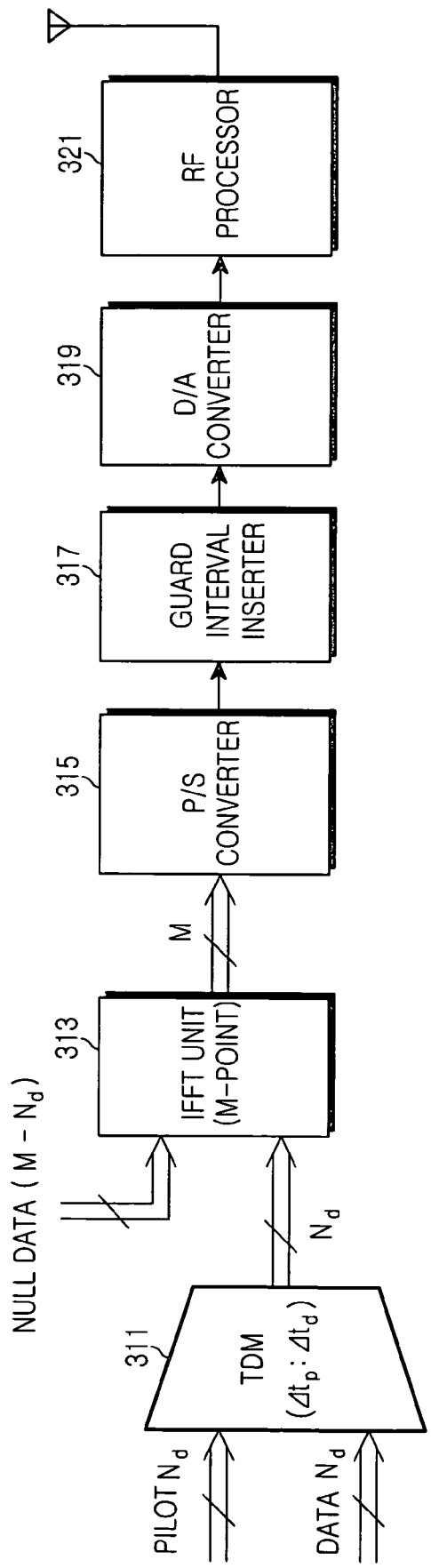
FIG. 3 is a block diagram illustrating an internal structure of an apparatus for transmitting uplink pilot signals according to a first embodiment of the present invention.

FIG. 3 is a block diagram illustrating an internal structure of an apparatus for transmitting uplink pilot signals according to a first embodiment of the present invention. Before a description of FIG. 3 is given, it will be assumed that an OFDMA communication system transmits pilot signals in the method described in connection with FIG. 2. In FIG. 2, because $N_d$ subcarriers are assigned to a particular transmitter, for example, a subscriber station, as a dedicated traffic channel, a pilot signal or a data signal is transmitted through the $N_d$ subcarriers. Further, in FIG. 2, because a period at which the pilot signal is transmitted is $\Delta t_p+\Delta t_d$ and a transmission time of the pilot signal is $\Delta t_p$, only a pilot signal is transmitted through the $N_d$ subcarriers for the time $\Delta t_p$ and only a data signal is transmitted through the $N_d$ subcarriers for a time $\Delta t_d$ except the time $\Delta t_p$ at periods of $\Delta t_p+\Delta t_d$.

Referring to FIG. 3, a time division multiplexer (TDM) 311 receives $N_d$ pilot subcarrier signals and $N_d$ data subcarrier signals, the TDM 311 multiplexes the received $N_d$ pilot subcarrier signals and $N_d$ data subcarrier signals according to the uplink pilot signal transmission method described in conjunction with FIG. 2, and outputs the time division multiplexed signals to an M-point inverse fast Fourier transform (IFFT) unit 313.

The IFFT unit 313 receives $N_d$ subcarrier signals output from the time division multiplexer 311, also receives (M-$N_d$) subcarrier signals, performs IFFT on the received signals, and outputs the IFFT-processed signals to a parallel-to-serial (P/S) converter 315. As described above, pilot signals or data signals are transmitted through the $N_d$ subcarriers, and null data is transmitted through the (M-$N_d$) subcarriers. The reason for transmitting null data through the (M-$N_d$) subcarriers is because signals on the subcarriers other than the $N_d$ subcarriers are not related to the dedicated traffic channel. The case where null data is transmitted through the $(M-N_d)$ subcarriers corresponds to the case where signals are transmitted through only the $N_d$ subcarriers and no separate signal is transmitted through the remaining $(M-N_d)$ subcarriers. In the uplink pilot signal transmission apparatus, if there is a signal to be transmitted through $(M-N_d)$ subcarriers other than the $N_d$ subcarriers, the signal is transmitted through subcarriers corresponding to a level of the signal among the $(M-N_d)$ subcarriers and null data is transmitted through only the remaining subcarriers. Of course, if a level of the transmission signal is so high that all of the $(M-N_d)$ subcarriers should be used, the signal is transmitted through the $(M-N_d)$ subcarriers.

The parallel-to-serial converter 315 serial-converts the signal output from the IFFT unit 313, and outputs the serial-converted signal to a guard interval inserter 317. The guard interval inserter 317 inserts a guard interval signal into the signal output from the parallel-to-serial converter 315, and outputs the guard interval-inserted signal to a digital-to-analog (D/A) converter 319. The guard interval is inserted to remove interference between a previous OFDM symbol transmitted at a previous OFDM symbol time and a current OFDM symbol to be transmitted at a current OFDM symbol time in the OFDM communication system. The guard interval signal is inserted in a cyclic prefix scheme or a cyclic postfix scheme. In the cyclic prefix scheme, a predetermined number of last samples of an OFDM symbol in a time domain are copied and inserted into a valid OFDM symbol, and in the cyclic postfix scheme, a predetermined number of first samples of an OFDM symbol in a time domain are copied and inserted into a valid OFDM symbol.

The digital-to-analog converter 319 analog-converts the signal output from the guard interval inserter 317, and outputs the analog-converted signal to a radio frequency (RF) processor 321. The RF processor 321, including a filter and a front-end unit, RF-processes the signal output from the digital-to-analog converter 319 such that the signal can be actually transmitted over the air, and transmits the RF-processed signal over the air via an antenna.

Figure 4:
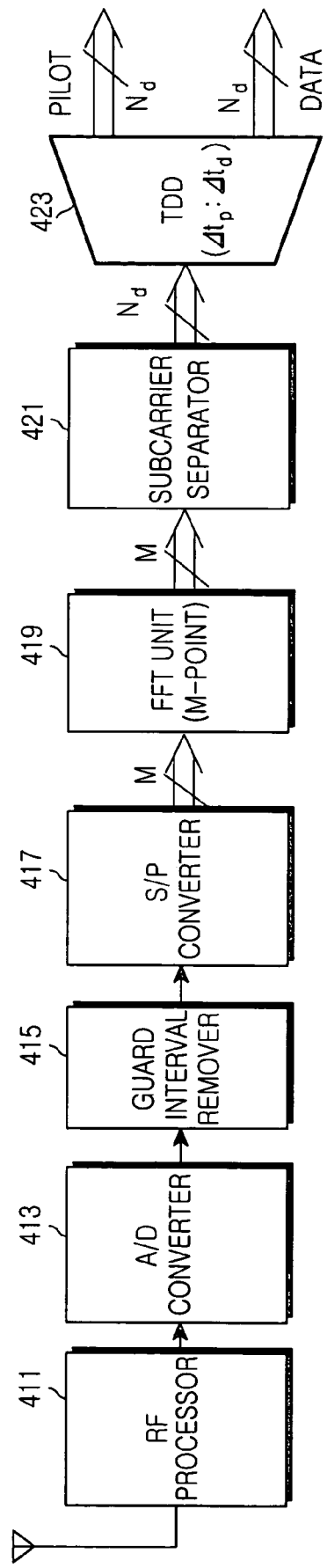
FIG. 4 is a block diagram illustrating an internal structure of an apparatus for receiving uplink pilot signals according to a first embodiment of the present invention.

FIG. 4 is a block diagram illustrating an internal structure of an apparatus for receiving uplink pilot signals according to a first embodiment of the present invention. The uplink pilot signal reception apparatus illustrated in FIG. 4 corresponds to the uplink pilot signal transmission apparatus illustrated in FIG. 3. A signal transmitted by the uplink pilot signal transmission apparatus is received via an antenna of the uplink pilot signal reception apparatus of a receiver or a base station, the received signal experiencing a multipath channel and having a noise component. The signal received via the antenna is input to an RF processor 411, and the RF processor 411 down-converts the signal received via the antenna into an intermediate frequency (IF) signal, and outputs the IF signal to an analog-to-digital (A/D) converter 413. The analog-to-digital converter 413 digital-converts an analog signal output from the RF processor 411, and outputs the digital-converted signal to a guard interval remover 415.

The guard interval remover 415 removes a guard interval signal from the digital-converted signal output from the analog-to-digital converter 413, and outputs the guard interval-removed signal to a serial-to-parallel converter 417. The serial-to-parallel converter 417 parallel-converts the serial signal output from the guard interval remover 415, and outputs the parallel-converted signal to a fast Fourier transform (FFT) unit 419. The FFT unit 419 performs M-point FFT on the signal output from the serial-to-parallel converter 417, and outputs the FFT-processed signal to a subcarrier separator 421. The subcarrier separator 421 separates the $N_d$ subcarriers used as a dedicated traffic channel from M subcarrier signals output from the FFT unit 419, and outputs the separated signals to a time division demultiplexer (TDD) 423. The time division demultiplexer 423 time division demultiplexes the signals output from the subcarrier separator 421 according to the uplink pilot signal transmission method described in connection with FIG. 2, and outputs the time division demultiplexed signals as pilot signals and data signals.

Figure 5:
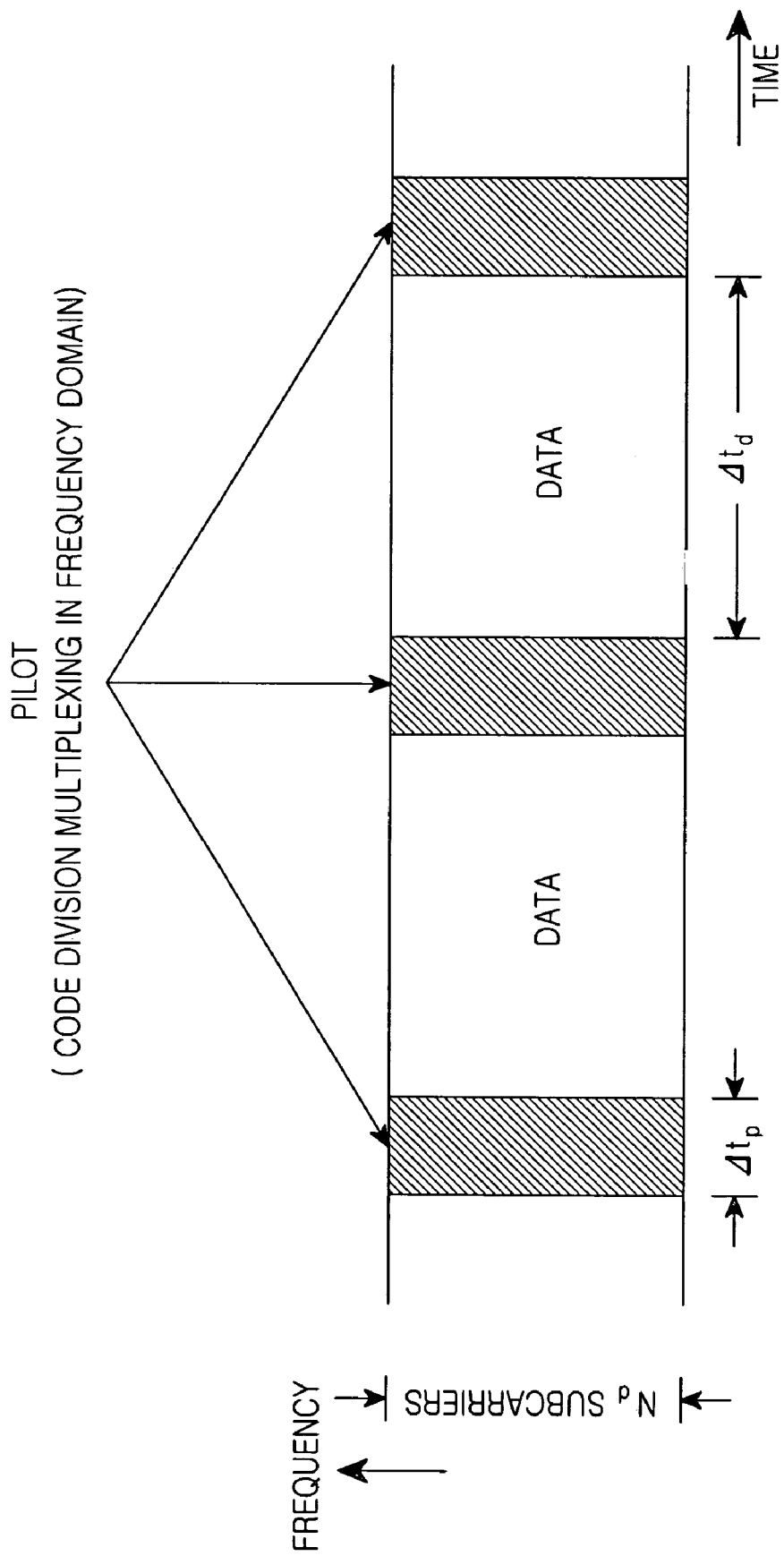
FIG. 5 is a diagram schematically illustrating an uplink pilot signal transmission structure according to a second embodiment of the present invention.

FIG. 5 is a diagram schematically illustrating an uplink pilot signal transmission structure according to a second embodiment of the present invention. In the uplink pilot signal transmission structure illustrated in FIG. 5, an OFDMA communication system assigns a subchannel comprised of $N_d$ ($N_d \leq N_D$) subcarriers to a particular transmitter, for example, a subscriber station, as a dedicated traffic channel. That is, the second embodiment of the present invention also proposes an uplink pilot signal transmission/reception scheme for the case where a dedicated traffic channel is assigned to a subscriber station. However, unlike the first embodiment that transmits a pilot signal through all of the $N_d$ subcarriers for a time $\Delta t_p$, the second embodiment transmits a pilot signal through a predetermined number of subcarriers, for example, through one subcarrier, and a data signal through $(N_d-1)$ subcarriers for the time $\Delta t_p$. In order to transmit a pilot signal and a data signal together for the time $\Delta t_p$, the second embodiment orthogonally spreads the pilot signal and the data signal using different orthogonal codes, or spreading codes. That is, for the time $\Delta t_p$, the pilot signal and the data signal undergo code division multiplexing in a frequency domain. A length of the orthogonal codes used for code division multiplexing, or orthogonal spreading, on the pilot signal and the data signal is $N_d$. That is, the second embodiment separately sets orthogonal codes used for pilot subcarriers and orthogonal codes used for data subcarriers in a frequency domain so that a data signal can be transmitted during a duration where a pilot signal is transmitted, thereby maximizing transmission efficiency. In other words, although the first embodiment transmits only a pilot signal through all of the $N_d$ subcarriers for the time $\Delta t_p$, so that an overhead of the pilot signal in a dedicated traffic channel comprised of the $N_d$ subcarriers is defined as $$\frac{\Delta t_p}{\Delta t_p + \Delta t_d},$$

the second embodiment transmits a pilot signal through one subcarrier and a data signal through $(N_d-1)$ subcarriers for the time $\Delta t_p$, so that an overhead of the pilot signal is much smaller than $$\frac{\Delta t_p}{\Delta t_p + \Delta t_d}.$$

Figure 6:
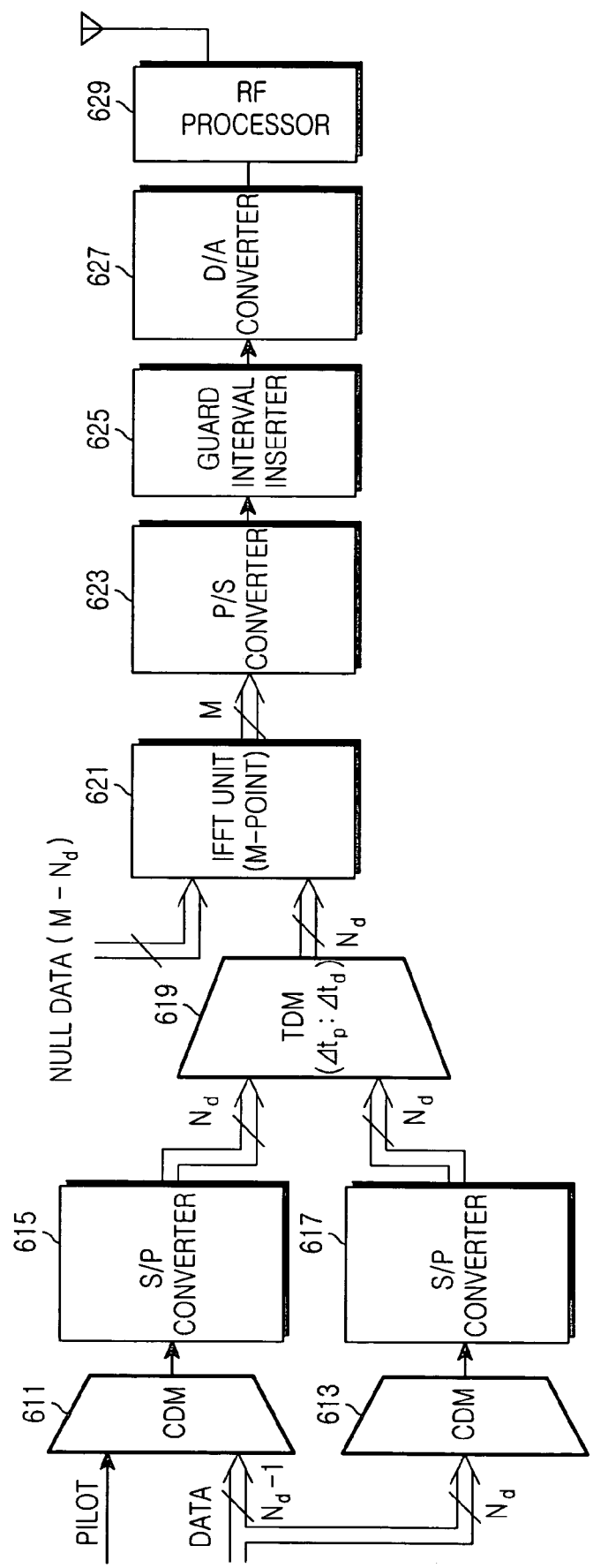
FIG. 6 is a block diagram illustrating an internal structure of an apparatus for transmitting uplink pilot signals according to a second embodiment of the present invention.

FIG. 6 is a block diagram illustrating an internal structure of an apparatus for transmitting uplink pilot signals according to a second embodiment of the present invention. Before a description of FIG. 6 is given, it will be assumed that an OFDMA communication system transmits pilot signals in the method described in connection with FIG. 5. In FIG. 5, because $N_d$ subcarriers are assigned to a particular transmitter, for example, a subscriber station, as a dedicated traffic channel, a pilot signal or a data signal is transmitted through the $N_d$ subcarriers. Further, in FIG. 5, because a period at which the pilot signal is transmitted is $\Delta t_p + \Delta t_d$ and a transmission time of the pilot signal is $\Delta t_p$, a pilot signal is transmitted through one $N_d$ subcarrier among the $N_d$ subcarriers and a data signal is transmitted through $(N_d-1)$ subcarriers for the time $\Delta t_p$, and only a data signal is transmitted through the $N_d$ subcarriers for a transmission duration $\Delta t_d$ except the time $\Delta t_p$, at periods of $\Delta t_p + \Delta t_d$.

Referring to FIG. 6, one pilot subcarrier signal and $(N_d-1)$ data subcarrier signals are input to a code division multiplexer (CDM) 611, and $N_d$ data subcarrier signals are input to a code division multiplexer 613. The code division multiplexer 611 orthogonally spreads the one pilot subcarrier signal and the $(N_d-1)$ data subcarrier signals using predetermined orthogonal codes, and outputs the spread signals to a serial-to-parallel converter 615. The code division multiplexer 613 orthogonally spreads the $N_d$ data subcarrier signals using predetermined orthogonal codes, and outputs the spread signals to a serial-to-parallel converter 617.

The serial-to-parallel converter 615 parallel-converts the signal output from the code division multiplexer 611, and outputs the parallel-converted signals to a time division multiplexer 619. Also, the serial-to-parallel converter 617 parallel-converts the signal output from the code division multiplexer 613, and outputs the parallel-converted signals to the time division multiplexer 619. The time division multiplexer 619 time division multiplexes the signals output from the serial-to-parallel converters 615 and 617 according to the uplink pilot signal transmission method described in conjunction with FIG. 5, and outputs the time division multiplexed signals to an M-point inverse fast Fourier transform unit 621. The IFFT unit 621 receives $N_d$ subcarrier signals output from the time division multiplexer 619, also receives $(M-N_d)$ subcarrier signals, performs IFFT on the received signals, and outputs the IFFT-processed signals to a parallel-to-serial (P/S) converter 623. As described above, pilot signals or data signals are transmitted through the $N_d$ subcarriers, and null data is transmitted through the $(M-N_d)$ subcarriers. The reason for transmitting null data through the $(M-N_d)$ subcarriers is the same as described in connection with FIG. 3, so a detailed description thereof will be omitted.

The parallel-to-serial converter 623 serial-converts the signals output from the IFFT unit 621, and outputs the serial-converted signal to a guard interval inserter 625. The guard interval inserter 625 inserts a guard interval signal into the signal output from the parallel-to-serial converter 623, and outputs the guard interval-inserted signal to a digital-to-analog converter 627. The digital-to-analog converter 627 analog-converts the signal output from the guard interval inserter 625, and outputs the analog-converted signal to an RF processor 629. The RF processor 629, including a filter and a front-end unit, RF-processes the signal output from the digital-to-analog converter 627 such that the signal can be actually transmitted over the air, and transmits the RF-processed signal over the air via a transmission antenna.

Figure 7:
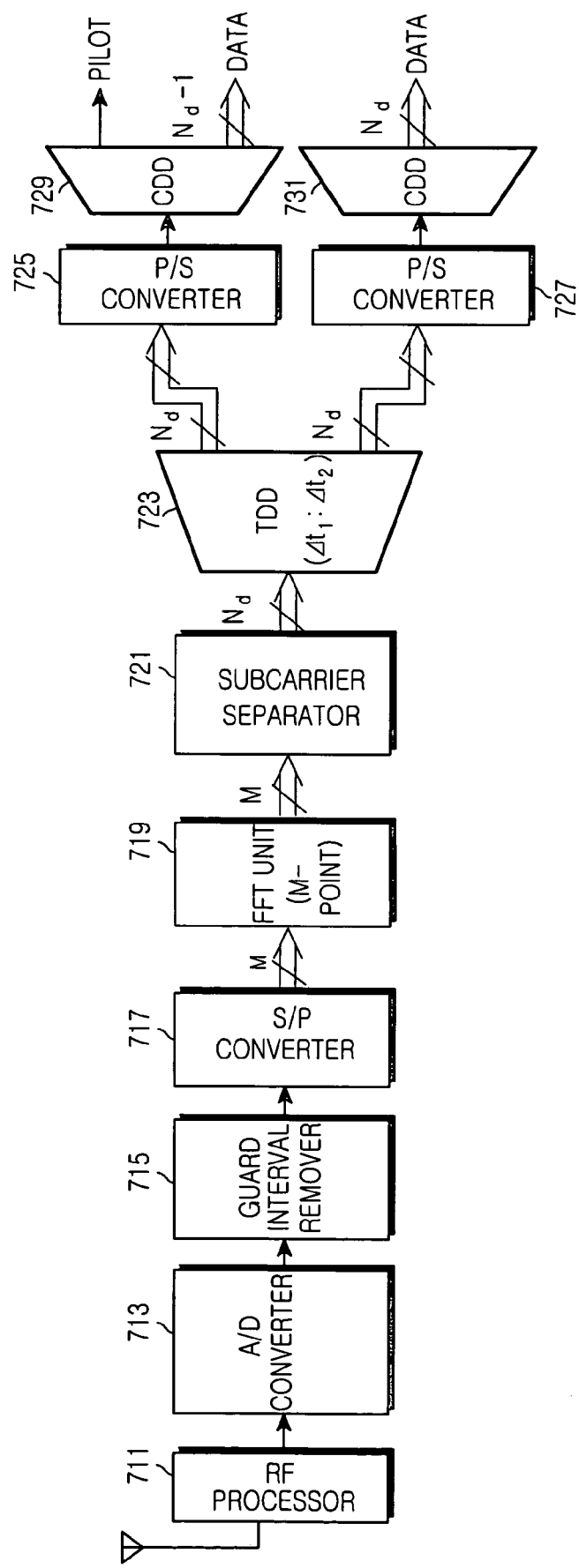
FIG. 7 is a block diagram illustrating an internal structure of an apparatus for receiving uplink pilot signals according to a second embodiment of the present invention.

FIG. 7 is a block diagram illustrating an internal structure of an apparatus for receiving uplink pilot signals according to a second embodiment of the present invention. The uplink pilot signal reception apparatus illustrated in FIG. 7 corresponds to the uplink pilot signal transmission apparatus illustrated in FIG. 6. A signal transmitted by the uplink pilot signal transmission apparatus is received via an antenna of the uplink pilot signal reception apparatus of a receiver or a base station, the received signal experiencing a multipath channel and having a noise component. The signal received via the antenna is input to an RF processor 711, and the RF processor 711 down-converts the signal received via the antenna into an intermediate frequency signal, and outputs the IF signal to an analog-to-digital converter 713. The analog-to-digital converter 713 digital-converts an analog signal output from the RF processor 711, and outputs the digital-converted signal to a guard interval remover 715.

The guard interval remover 715 removes a guard interval signal from the digital-converted signal output from the analog-to-digital converter 713, and outputs the guard interval-removed signal to a serial-to-parallel converter 717. The serial-to-parallel converter 717 parallel-converts the serial signal output from the guard interval remover 715, and outputs the parallel-converted signal to a fast Fourier transform unit 719. The FFT unit 719 performs M-point FFT on the signal output from the serial-to-parallel converter 717, and outputs the FFT-processed signal to a subcarrier separator 721. The subcarrier separator 721 separates the $N_d$ subcarriers used as a dedicated traffic channel from M subcarrier signals output from the FFT unit 719, and outputs the separated signals to a time division demultiplexer 723. The time division demultiplexer 723 time division demultiplexes the signals output from the subcarrier separator 721 according to the uplink pilot signal transmission method described in connection with FIG. 5, and outputs subcarrier signals received for the time $\Delta t_p$ to a parallel-to-serial converter 725 and subcarrier signals received for the time $\Delta t_d$ to a parallel-to-serial converter 727.

The parallel-to-serial converter 725 serial-converts the subcarrier signals output from the time division demultiplexer 723, and outputs the serial-converted signals to a code division demultiplexer 729. Similarly, the parallel-to-serial converter 727 serial-converts the subcarrier signals output from the time division demultiplexer 723, and outputs the serial-converted signals to a code division demultiplexer 731. The code division demultiplexer 729 orthogonally despreads one pilot subcarrier signal and $(N_d-1)$ data subcarrier signals from among the signals output from the parallel-to-serial converter 725 using orthogonal codes separately assigned thereto. The code division demultiplexer 731 orthogonally despreads $N_d$ subcarrier signals output from the parallel-to-serial converter 727 using a predetermined orthogonal code. The orthogonal codes used in the code division demultiplexers 729 and 731 are identical to the orthogonal codes used in the code division multiplexers 611 and 613 of the uplink pilot signal transmission apparatus of FIG. 6.

Figure 8:
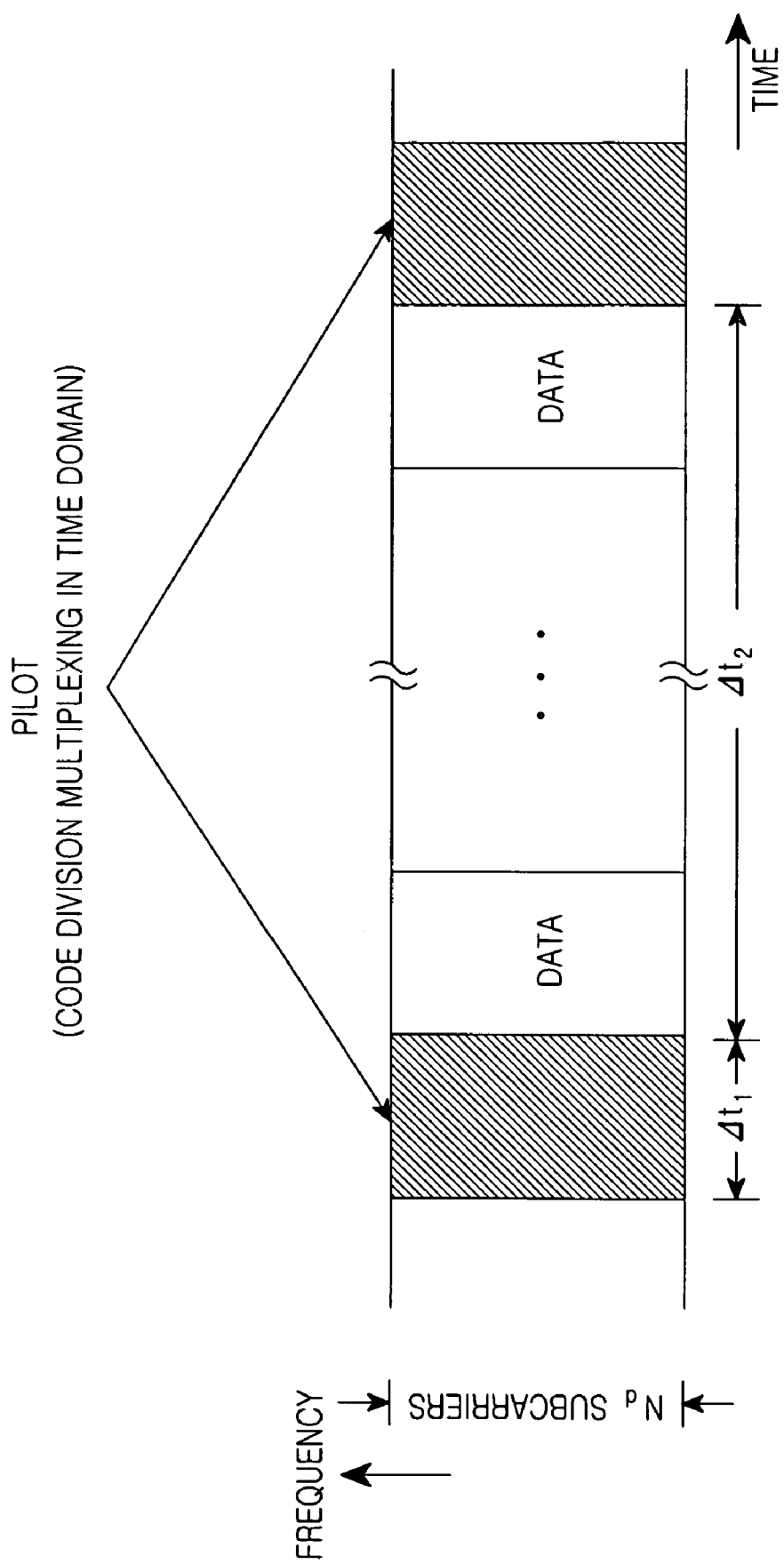
FIG. 8 is a diagram schematically illustrating an uplink pilot signal transmission structure according to a third embodiment of the present invention.

FIG. 8 is a diagram schematically illustrating an uplink pilot transmission structure according to a third embodiment of the present invention. In the uplink pilot signal transmission structure illustrated in FIG. 8, an OFDMA communication system assigns a subchannel comprised of $N_d$ ($N_d \leq N_D$) subcarriers to a particular transmitter, for example, a subscriber station, as a dedicated traffic channel. That is, the third embodiment of the present invention also proposes an uplink pilot signal transmission/reception scheme for the case where a dedicated traffic channel is assigned to a subscriber station. However, unlike the first and second embodiments, the third embodiment equally transmits pilot signals and data signals through corresponding subcarriers for a time $\Delta t_1$, and transmits only data signals through all of corresponding subcarriers for a time $\Delta t_2$. In order to equally transmit pilot signals and data signals through corresponding subcarriers for a time $\Delta t_1$, the third embodiment performs code division multiplexing on the pilot signals and the data signals in a time domain for the time $\Delta t_1$. As described above, the codes used for orthogonally spreading the pilot signals and the data signals are orthogonal codes. A length of the orthogonal codes used for the pilot signals and the data signals is L. That is, the third embodiment separately sets orthogonal codes used for pilot subcarriers and orthogonal codes used for data subcarriers in a time domain so that a data signal can be transmitted even during a duration where a pilot signal is transmitted, thereby maximizing transmission efficiency.

In other words, the third embodiment simultaneously transmits pilot signals and data signals through corresponding subcarriers for the time $\Delta t_1$, so that an overhead of the pilot signal in a dedicated traffic channel comprised of the $N_d$ subcarriers is much smaller than $$\frac{\Delta t_1}{\Delta t_1 + \Delta t_2}.$$

Figure 9:
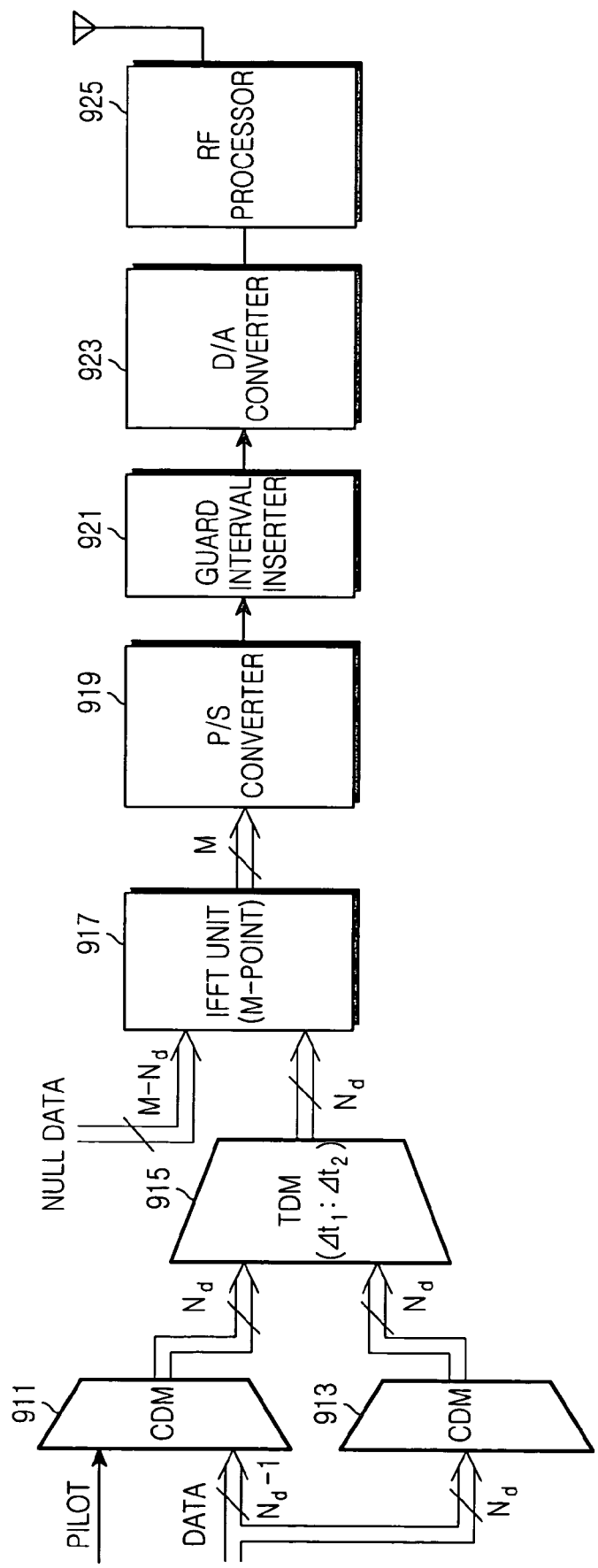
FIG. 9 is a block diagram illustrating an internal structure of an apparatus for transmitting uplink pilot signals according to a third embodiment of the present invention.

FIG. 9 is a block diagram illustrating an internal structure of an apparatus for transmitting uplink pilot signals according to a third embodiment of the present invention. Before a description of FIG. 9 is given, it will be assumed that an OFDMA communication system transmits pilot signals in the method described in connection with FIG. 8.

Referring to FIG. 9, one pilot subcarrier signal and ($N_d$–1) data subcarrier signals are input to a code division multiplexer 911, and $N_d$ data subcarrier signals are input to a code division multiplexer 913. The code division multiplexer 911 orthogonally spreads the one pilot subcarrier signal and the ($N_d$–1) data subcarrier signals using predetermined orthogonal codes, and outputs the spread signals to a time division multiplexer 915. The code division multiplexer 913 orthogonally spreads the ($N_d$) data subcarrier signals using a predetermined orthogonal code, and outputs the spread signals to the time division multiplexer 915.

The time division multiplexer 915 time division multiplexes the signals output from the code division multiplexers 911 and 913 according to the uplink pilot signal transmission method described in conjunction with FIG. 8, and outputs the time division multiplexed signals to an M-point inverse fast Fourier transform unit 917. The IFFT unit 917 receives $N_d$ subcarrier signals output from the time division multiplexer 915, also receives (M-$N_d$) subcarrier signals, performs IFFT on the received signals, and outputs the IFFT-processed signals to a parallel-to-serial converter 919. As described above, pilot signals or data signals are transmitted through the $N_d$ subcarriers, and null data is transmitted through the (M-$N_d$) subcarriers. The reason for transmitting null data through the (M-$N_d$) subcarriers is the same as described in connection with FIG. 3, so a detailed description thereof will be omitted.

The parallel-to-serial converter 919 serial-converts the signals output from the IFFT unit 917, and outputs the serial-converted signal to a guard interval inserter 921. The guard interval inserter 921 inserts a guard interval signal into the signal output from the parallel-to-serial converter 919, and outputs the guard interval-inserted signal to a digital-to-analog converter 923. The digital-to-analog converter 923 analog-converts the signal output from the guard interval inserter 921, and outputs the analog-converted signal to an RF processor 925. The RF processor 925, including a filter and a front-end unit, RF-processes the signal output from the digital-to-analog converter 923 such that the signal can be actually transmitted over the air, and transmits the RF-processed signal over the air via a transmission antenna.

Figure 10:
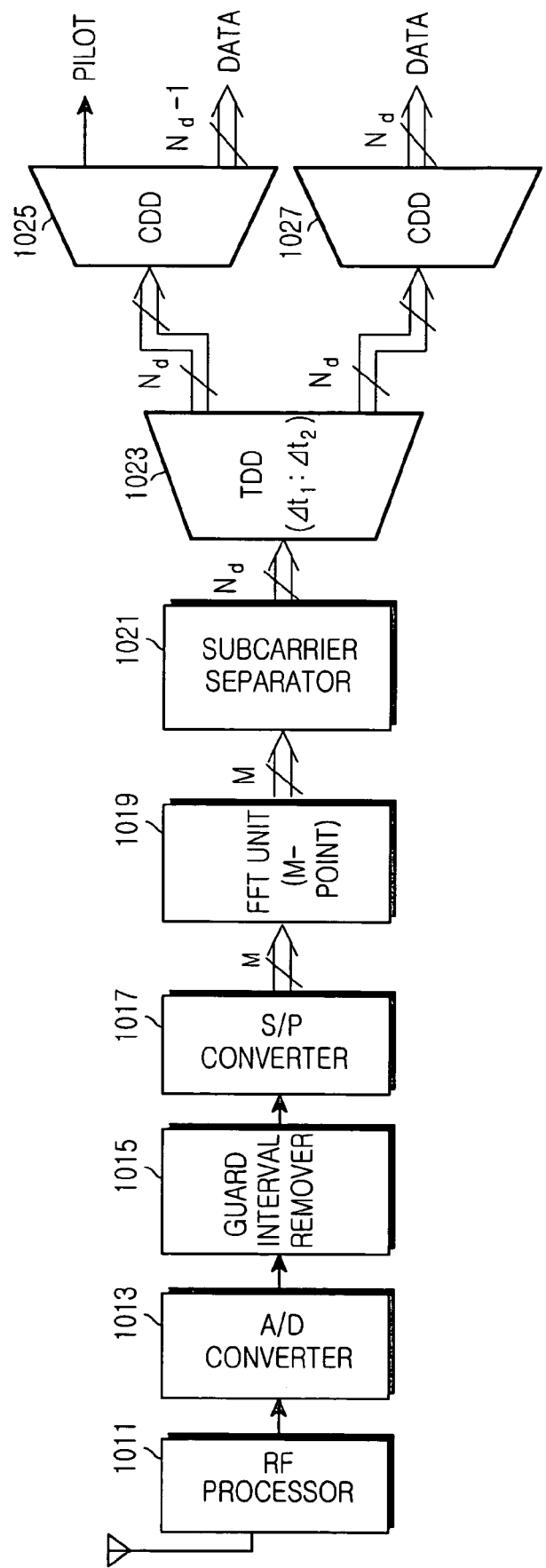
FIG. 10 is a block diagram illustrating an internal structure of an apparatus for receiving uplink pilot signals according to a third embodiment of the present invention.

FIG. 10 is a block diagram illustrating an internal structure of an apparatus for receiving uplink pilot signals according to a third embodiment of the present invention. The uplink pilot signal reception apparatus illustrated in FIG. 10 corresponds to the uplink pilot signal transmission apparatus illustrated in FIG. 9. A signal transmitted by the uplink pilot signal transmission apparatus is received via an antenna of the uplink pilot signal reception apparatus of a receiver or a base station, the received signal experiencing a multipath channel and having a noise component. The signal received via the antenna is input to an RF processor 1011, and the RF processor 1011 down-converts the signal received via the antenna into an intermediate frequency signal, and outputs the IF signal to an analog-to-digital converter 1013. The analog-to-digital converter 1013 digital-converts an analog signal output from the RF processor 1011, and outputs the digital-converted signal to a guard interval remover 1015.

The guard interval remover 1015 removes a guard interval signal from the digital-converted signal output from the analog-to-digital converter 1013, and outputs the guard interval-removed signal to a serial-to-parallel converter 1017. The serial-to-parallel converter 1017 parallel-converts the serial signal output from the guard interval remover 1015, and outputs the parallel-converted signal to a fast Fourier transform unit 1019. The FFT unit 1019 performs M-point FFT on the signal output from the serial-to-parallel converter 1017, and outputs the FFT-processed signal to a subcarrier separator 1021. The subcarrier separator 1021 separates the $N_d$ subcarriers used as a dedicated traffic channel from M subcarrier signals output from the FFT unit 1019, and outputs the separated signals to a time division demultiplexer 1023. The time division demultiplexer 1023 time division demultiplexes the signals output from the subcarrier separator 1021 according to the uplink pilot signal transmission method described in connection with FIG. 8, and outputs subcarrier signals received for the time $\Delta t_1$ to a code division demultiplexer 1025 and subcarrier signals received for the time $\Delta t_2$ to a code division demultiplexer 1027.

The code division demultiplexer 1025 orthogonally despreads the signals output from the time division demultiplexer 1023 for the time $\Delta t_1$, with orthogonal codes, and outputs one pilot subcarrier signal and ($N_d$–1) data subcarrier signals. Similarly, the code division demultiplexer 1027 orthogonally despreads the signals output from the time division demultiplexer 1023 for the time $\Delta t_2$ with orthogonal codes, and outputs $N_d$ data subcarrier signals. The orthogonal codes used in the code division demultiplexers 1025 and 1027 are identical to the orthogonal codes used in the code division multiplexers 911 and 913 of the uplink pilot signal transmission apparatus of FIG. 9.

Figure 11:
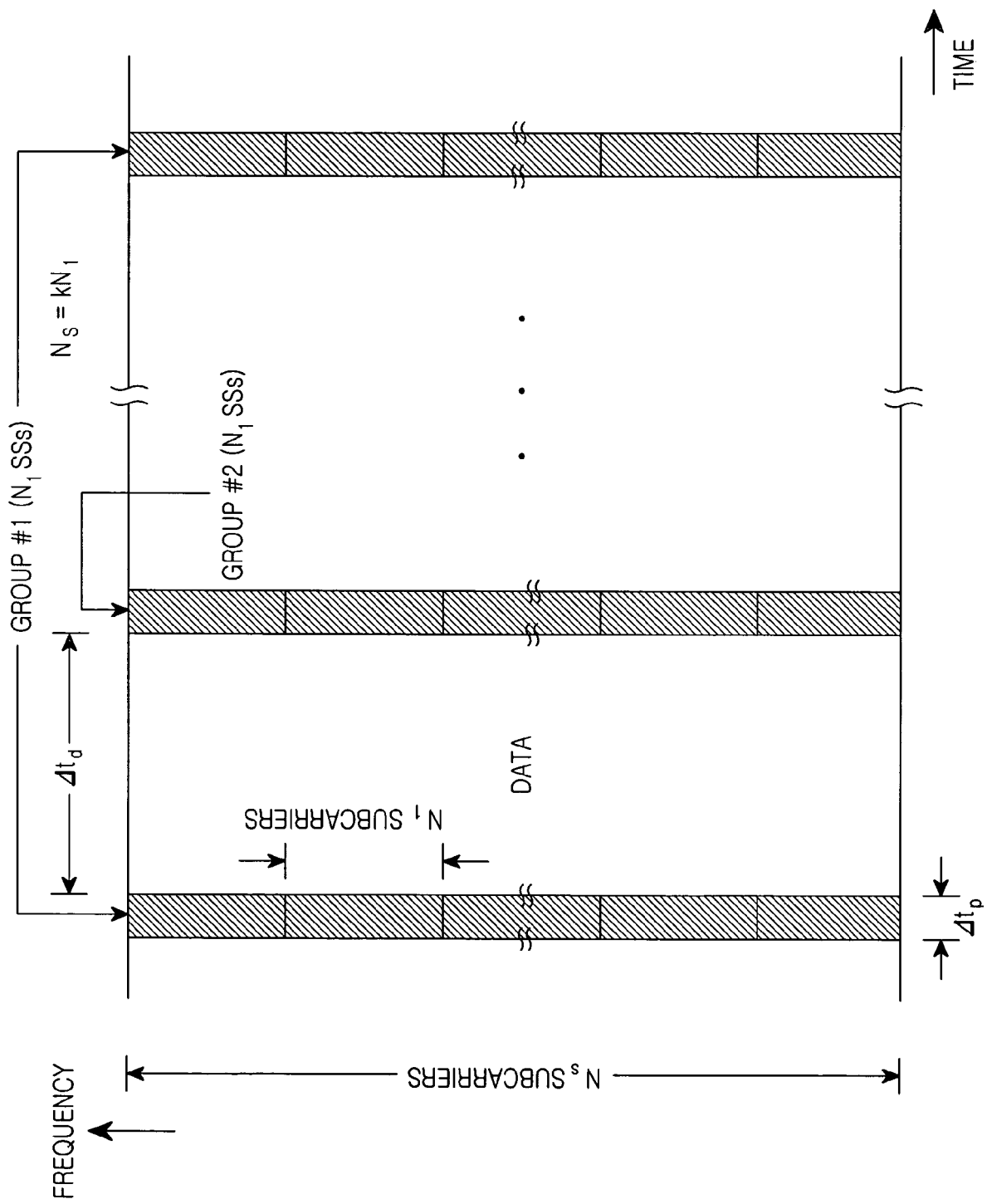
FIG. 11 is a diagram schematically illustrating an uplink pilot signal transmission structure according to a fourth embodiment of the present invention.

FIG. 11 is a diagram schematically illustrating an uplink pilot transmission structure according to a fourth embodiment of the present invention. In the uplink pilot signal transmission method illustrated in FIG. 11, an OFDMA communication system assigns a subchannel comprised of $N_d$ ($N_d \leq N_D$) subcarriers to a particular transmitter, for example, a subscriber station, as a shared traffic channel. That is, the fourth embodiment of the present invention proposes an uplink pilot signal transmission/reception scheme for the case where a shared traffic channel is assigned to a subscriber station. As illustrated in FIG. 11, an uplink pilot signal is transmitted for a time $\Delta t_p$ at periods of $\Delta t_p + \Delta t_d$.

It will be assumed in FIG. 11 that orthogonal codes, with a length $N_1$ satisfying a relationship $N_s = k \times N_1$ for a particular integer k, are used. When unique orthogonal codes with the length $N_1$ are assigned to respective subscriber stations sharing the shared traffic channel, each of the subscriber stations orthogonally spreads a pilot signal using an orthogonal code uniquely assigned thereto for a time $\Delta t_p$ before transmission. Therefore, when the orthogonal codes with a length $N_1$ are used, k subscriber stations can simultaneously transmit pilot signals for the time $\Delta t_p$. That is, if it is assumed that there are U subscriber station groups using the shared traffic channel, a particular subscriber station transmits a pilot signal at periods of $[(\Delta t_p + \Delta t_d) \times U]$.

For example, if it is assumed that $N_s=800$ and $N_1=16$, 16 subscriber stations can simultaneously transmit pilot signals for a time $\Delta t_p$. The pilot signals of the 16 subscriber stations are repeated 50 times (k=50) in a frequency domain, and a base station can measure a channel condition in a frequency domain corresponding to 800 subcarriers used as a shared traffic channel. If it is assumed that there are 4 subscriber station groups using the shared traffic channel (U=4), $\Delta t_p = 50$ μsec and $\Delta t_d = 1$ msec, a subscriber station belonging to a particular subscriber station group can transmit a pilot signal at periods of $[(\Delta t_p + \Delta t_d) \times U] = [(50 \text{ μsec} + 1 \text{ msec}) \times 4] = 4.2$ msec.

Figure 12:
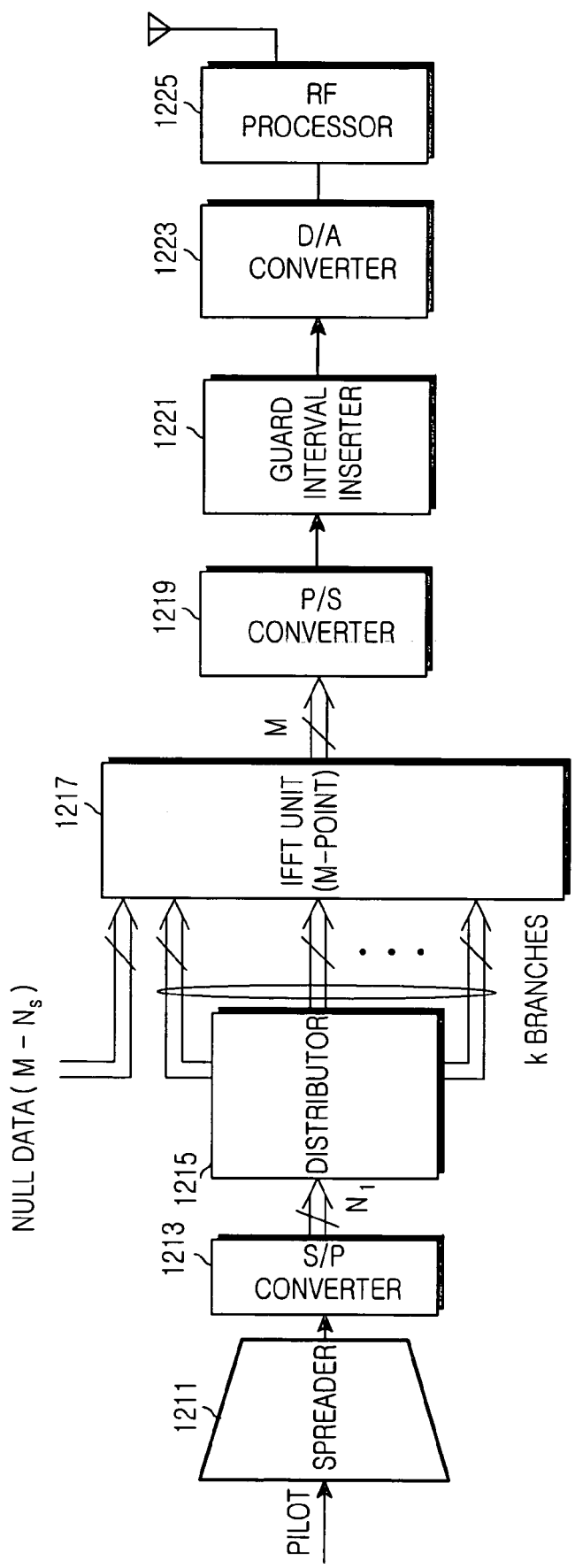
FIG. 12 is a block diagram illustrating an internal structure of an apparatus for transmitting uplink pilot signals according to a fourth embodiment of the present invention.

FIG. 12 is a block diagram illustrating an internal structure of an apparatus for transmitting uplink pilot signals according to a fourth embodiment of the present invention. Before a description of FIG. 12 is given, it will be assumed that an OFDMA communication system transmits pilot signals in the method described in connection with FIG. 11. Referring to FIG. 12, a pilot signal for a particular subscriber station is input to a spreader 1211, and the spreader 1211 orthogonally spreads the input pilot signal using a length $N_1$ orthogonal code uniquely assigned to the subscriber station, and outputs the spread signal to a serial-to-parallel converter 1213. The serial-to-parallel converter 1213 parallel-converts the signal output from the spreader 1211, and outputs the parallel-converted signals to a distributor 1215. The distributor 1215 distributes the signals output from the serial-to-parallel converter 1213 to k branches to output the signals to an inverse fast Fourier transform unit 1217.

The IFFT unit 1217 receives subcarrier signals output from the distributor 1215, also receives (M-$N_s$) subcarrier signals, performs IFFT on the received signals, and outputs the IFFT-processed signals to a parallel-to-serial converter 1219. Here, null data is transmitted through the (M-$N_s$) subcarriers. The reason for transmitting null data through the (M-$N_s$) subcarriers is because signals on the subcarriers other than the $N_s$ subcarriers are not related to the shared traffic channel. The case where null data is transmitted through the (M-$N_s$) subcarriers corresponds to the case where signals are transmitted through only the $N_s$ subcarriers and no separate signal is transmitted through the remaining (M-$N_s$) subcarriers. In the uplink pilot signal transmission apparatus, if there is a signal to be transmitted through (M-$N_s$) subcarriers other than the $N_s$ subcarriers, the signal is transmitted through subcarriers corresponding to a level of the signal among the (M-$N_s$) subcarriers and null data is transmitted through only the remaining subcarriers. Of course, if a level of the transmission signal is so high that all of the (M-$N_s$) subcarriers should be used, the signal is transmitted through the (M-$N_s$) subcarriers.

The parallel-to-serial converter 1219 serial-converts the signals output from the IFFT unit 1217, and outputs the serial-converted signal to a guard interval inserter 1221. The guard interval inserter 1221 inserts a guard interval signal into the signal output from the parallel-to-serial converter 1219, and outputs the guard interval-inserted signal to a digital-to-analog converter 1223. The digital-to-analog converter 1223 analog-converts the signal output from the guard interval inserter 1221, and outputs the analog-converted signal to an RF processor 1225. The RF processor 1225, including a filter and a front-end unit, RF-processes the signal output from the digital-to-analog converter 1223 such that the signal can be actually transmitted over the air, and transmits the RF-processed signal over the air via a transmission antenna.

Figure 13:
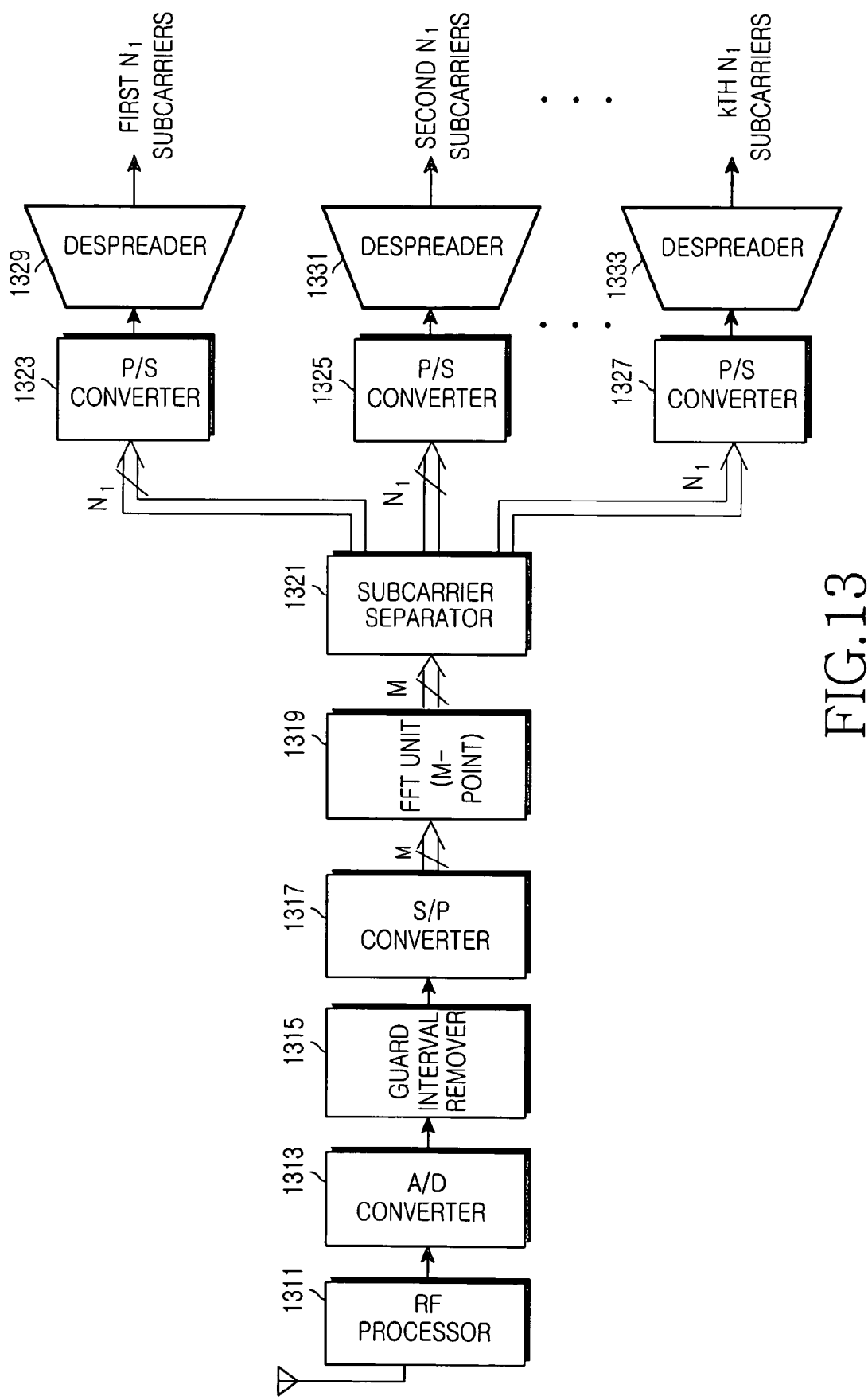
FIG. 13 is a block diagram illustrating an internal structure of an apparatus for receiving uplink pilot signals according to a fourth embodiment of the present invention.

FIG. 13 is a block diagram illustrating an internal structure of an apparatus for receiving uplink pilot signals according to a fourth embodiment of the present invention. The uplink pilot signal reception apparatus illustrated in FIG. 13 corresponds to the uplink pilot signal transmission apparatus illustrated in FIG. 12. A signal transmitted by the uplink pilot signal transmission apparatus is received via an antenna of the uplink pilot signal reception apparatus of a receiver or a base station, the received signal experiencing a multipath channel and having a noise component. The signal received via the antenna is input to an RF processor 1311, and the RF processor 1311 down-converts the signal received via the antenna into an intermediate frequency signal, and outputs the IF signal to an analog-to-digital converter 1313. The analog-to-digital converter 1313 digital-converts an analog signal output from the RF processor 1311, and outputs the digital-converted signal to a guard interval remover 1315.

The guard interval remover 1315 removes a guard interval signal from the digital-converted signal output from the analog-to-digital converter 1313, and outputs the guard interval-removed signal to a serial-to-parallel converter 1317. The serial-to-parallel converter 1317 parallel-converts the serial signal output from the guard interval remover 1315, and outputs the parallel-converted signal to a fast Fourier transform unit 1319. The FFT unit 1319 performs M-point FFT on the signal output from the serial-to-parallel converter 1317, and outputs the FFT-processed signal to a subcarrier separator 1321. The subcarrier separator 1321 separates the $N_s$ subcarriers used as a shared traffic channel from M subcarrier signals output from the FFT unit 1319. Further, the subcarrier separator 1321 groups the separated $N_s$ subcarriers in $N_1$ subcarriers, and separately outputs the $N_1$-subcarrier groups to parallel-to-serial converters 1323 through 1327.

For example, let's assume that the subcarrier separator 1321 has grouped the $N_s$ subcarriers into k $N_1$-subcarrier groups. In this case, the subcarrier separator 1321 outputs first $N_1$ subcarriers (first $N_1$-subcarrier group) to a parallel-to-serial converter 1323, second $N_1$ subcarriers (second $N_1$-subcarrier group) to a parallel-to-serial converter 1325, and $k^{th}$ $N_1$ subcarriers ($k^{th}$ $N_1$-subcarrier group) to a parallel-to-serial converter 1327.

The parallel-to-serial converter 1323 serial-converts the first $N_1$ subcarriers output from the subcarrier separator 1321, and outputs the serial-converted subcarriers to a despreader 1329. The parallel-to-serial converter 1325 serial-converts the second $N_1$ subcarriers output from the subcarrier separator 1321, and outputs the serial-converted subcarriers to a despreader 1331. In the same manner, the parallel-to-serial converter 1327 serial-converts the $k^{th}$ $N_1$ subcarriers output from the subcarrier separator 1321, and outputs the serial-converted subcarriers to a despreader 1333.

The despreader 1329 despreads the signal output from the parallel-to-serial converter 1323 using an orthogonal code, or a despreading code, uniquely assigned to the subscriber station. The signal output from the despreader 1329 becomes a pilot signal for a frequency band corresponding to first $N_1$ subcarriers among the $N_s$ subcarriers constituting the shared traffic channel. The despreader 1331 orthogonally despreads the signal output from the parallel-to-serial converter 1325 using the orthogonal code uniquely assigned to the subscriber station. The signal output from the despreader 1331 becomes a pilot signal for a frequency band corresponding to second $N_1$ subcarriers among the $N_s$ subcarriers constituting the shared traffic channel. In the same manner, the despreader 1333 orthogonally despreads the signal output from the parallel-to-serial converter 1327 using the orthogonal code uniquely assigned to the subscriber station. The signal output from the despreader 1333 becomes a pilot signal for a frequency band corresponding to the last $N_1$ subcarriers among the $N_s$ subcarriers constituting the shared traffic channel.

As can be understood from the foregoing description, the uplink pilot signal transmission/reception scheme proposed in the present invention enables an uplink link adaptation scheme in an OFDMA communication system. In the proposed uplink pilot signal transmission/reception scheme, a base station can measure a channel condition of a subscriber station, so that the uplink link adaptation scheme such as an AMC scheme can be used even for uplink signals.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a reference signal in an Orthogonal Frequency Division Multiple Access (OFDMA) communication system in which a total frequency band is divided into $N_T$ subcarrier bands, the method comprising the steps of:

spreading reference signals of $N_1$ subscriber stations using different orthogonal codes for the subscriber stations in $N_s$ subcarrier bands shared by all subscriber stations included in the OFDMA communication system from among the $N_T$ subcarrier bands;

distributing the spread reference signals according to k in order that the spread reference signals are repeated by k times in a frequency domain; and transmitting the distributed signals for a first time duration, wherein $N_s = k \times N_1$.

2. The method of claim 1, wherein the step of transmitting the distributed signals comprises the step of:

performing inverse fast Fourier transform (IFFT) on the distributed signals, and parallel-to-serial converting the IFFT-processed signal;

inserting a guard interval signal for interference removal into the parallel-to-serial converted signal;

digital-to-analog converting the guard interval-inserted signal, and converting the digital-to-analog converted signal into a radio frequency (RF) signal; and transmitting the radio frequency signal.

3. An apparatus for transmitting a reference signal in an Orthogonal Frequency Division Multiple Access (OFDMA) communication system in which a total frequency band is divided into $N_T$ subcarrier bands, the apparatus comprising:

a spreader for spreading reference signals of $N_1$ subscriber stations using different orthogonal codes for the subscriber stations in $N_s$ subcarrier bands shared by all subscriber stations included in the OFDMA communication system from among the $N_T$ subcarrier bands;

a distributor for distributing the spread reference signals according to k in order that the spread reference signals are repeated by k times in a frequency domain; and a transmitter for transmitting the distributed signals for a first time duration, wherein $N_s = k \times N_1$.

4. The apparatus of claim 3, wherein the transmitter comprises:

an inverse fast Fourier transform (IFFT) unit for performing IFFT on the distributed signals;

a parallel-to-serial converter for parallel-to-serial converting the IFFT-processed signal;

a guard interval inserter for inserting a guard interval signal for interference removal into the parallel-to-serial converted signal;

a digital-to-analog converter for digital-to-analog converting the guard interval-inserted signal; and a radio frequency (RF) processor for converting the digital-to-analog converted signal into an RF signal before transmission.

* * * * *